US007607601B2

(12) United States Patent
Rodriguez

(10) Patent No.: US 7,607,601 B2
(45) Date of Patent: Oct. 27, 2009

(54) WEAR TIP FOR ROTARY MINERAL BREAKER

(76) Inventor: Damian Rodriguez, 263 S. Vasco Rd., Livermore, CA (US) 94551

( * ) Notice: Subject to any disclaimer, the term of this patent is extended or adjusted under 35 U.S.C. 154(b) by 0 days.

(21) Appl. No.: 12/235,844

(22) Filed: Sep. 23, 2008

(65) Prior Publication Data

US 2009/0014569 A1 Jan. 15, 2009

Related U.S. Application Data

(62) Division of application No. 11/281,053, filed on Nov. 16, 2005, now Pat. No. 7,427,042.

(51) Int. Cl.
*B02C 23/00* (2006.01)
*A01F 21/00* (2006.01)

(52) U.S. Cl. ...................................... 241/275; 241/300

(58) Field of Classification Search ................. 241/300, 241/197, 275
See application file for complete search history.

(56) References Cited

U.S. PATENT DOCUMENTS 7,427,042 B2 * 9/2008 Rodriguez .................. 241/300

* cited by examiner

*Primary Examiner*—Faye Francis
(74) *Attorney, Agent, or Firm*—Brian Beverly; Beeson Skinner Beverly, LLP

(57) ABSTRACT

A wear tip for a rotor of a centrifugal mineral breaker, comprises a carrier 80 having at least two wear edges 82, 84 each disposed transversely to the path of mineral material being ejected from the rotor. A longitudinally extending groove 122 between the first 82 and second 84 wear edges forms a rock retaining recession. Each wear edge 82, 84 has a wear face 108 with a recess 106 therein. An insert 112 of abrasion resistant material is disposed in each recess 106. Each insert 112 has an outer wear surface and an arcuate inner surface 114 conforming to the profile of the recess 106. The outer wear surface of each insert 112 is generally in planar alignment with the wear face 108 of one of the wear edges 82, 84.

14 Claims, 10 Drawing Sheets

WEAR TIP FOR ROTARY MINERAL BREAKER

CROSS-REFERENCE TO RELATED APPLICATION

This application is a divisional of application Ser. No. 11/281,053 filed Nov. 16, 2005 now U.S. Pat. No. 7,427,042.

BACKGROUND OF THE INVENTION

1. Field of the Invention

The present invention relates to the field of mineral breakers, and more particularly, to replaceable wear tips for rotors in centrifugal mineral breakers.

2. Description of the Prior Art

Centrifugal mineral breakers, such as that described in U.S. Pat. No. 3,970,257, operate by feeding mineral material axially into a rotor from which it is expelled outwardly at high speeds into a housing surrounding the rotor. Some of the expelled material forms a protective rock lining in the housing. Mineral material subsequently ejected through discharge ports in the rotor impacts the protective rock lining. Similarly, a protective rock lining forms inside the rotor protecting most of the inside surfaces of the rotor, except for surfaces located near the discharge ports through which mineral material is ejected from the rotor. The parts of the rotor near the discharge ports are subjected to severe wearing forces from the stream of mineral material being ejected. Accordingly, discharge ports are normally provided with wear tips to protect the port edge from rapidly deteriorating. Typically, a wear tip is placed vertically across the width of each discharge port. The wear tip forms a hardened lip which protects the rotor from erosion caused by the rock exiting with extreme force and velocity.

Commonly, wear tips have a generally square profile and can be dropped or bolted into place. In the drop-in style, a square-shaped socket is provided in the bottom ring of the rotor in which the wear tip is seated. A top part of the wear tip is held in place in a square aperture in the top ring of the rotor. For bolted designs, numerous arrangements are possible to fix the wear tip in place. The wear edge of the tip is that corner most exposed to abrasion from streaming mineral material. The wear edge is generally provided with an abrasion resistant insert, typically made from tungsten carbide, which is much more effective at withstanding the wear forces of the stream of material. The main body, or carrier portion, of the wear tip is constructed of steel or cast iron which is much more susceptible to erosion than the insert. The insert generally bears a uniform rectangular profile through its longitudinal dimension and fits in a conforming channel or recess in the wear edge of the tip. To prevent the insert from slipping out of the insert, it is held in place with an industrial adhesive. Frequently, as an added measure of assurance, a bead of weld is applied in the recess in the top and bottom of the insert in case the adhesive fails. Often an insert is assembled from several pieces which are fitted in end-to-end abutment in the recess. Unfortunately, this leaves joints between the individual pieces which weakens the bond of each piece to the carrier and leaves a space into which fine particulate matter inserts itself between adjoining pieces. As a result individual pieces of insert material have been known to separate and creep out of the recess thereby exposing the wear tip to erosive damage.

The primary objective for wear tips is to provide sufficient longevity that the rotor will be protected until it can be observed during a regular maintenance check that the tips have become damaged so that they may be replaced. Wear tips experience greatest wear near the middle of the span across the discharge port and it has been found that unused portions at the top and bottom of the tungsten carbide insert are routinely discarded when the center of the insert becomes fully eroded or loses its usefulness through breakage or detachment. Applicants have observed that under typical wear patterns, approximately forty to fifty percent of the original tungsten carbide is not utilized and is discarded as waste in this manner when the middle of the insert is no longer useful. Since tungsten carbide is relatively expensive, discarding nearly half of the insert is economically inefficient.

BRIEF DESCRIPTION OF THE ILLUSTRATIONS

DETAILED DESCRIPTION OF THE ILLUSTRATED EMBODIMENTS

Figure 1:
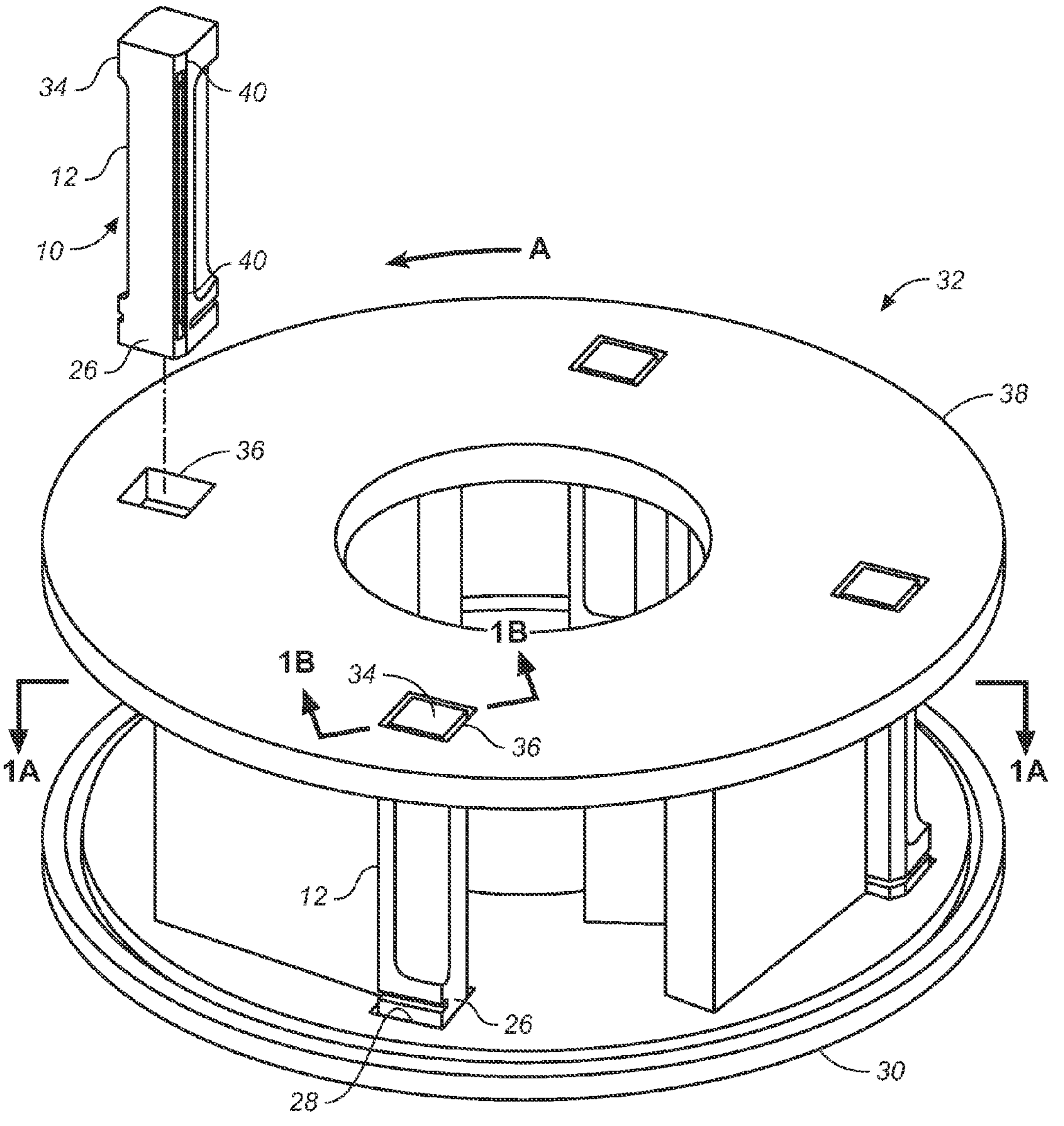
FIG. 1 is a perspective view of a wear tip according to the invention shown in exploded relation to a representative rotor of a rotary mineral breaker.
Figure 1A:
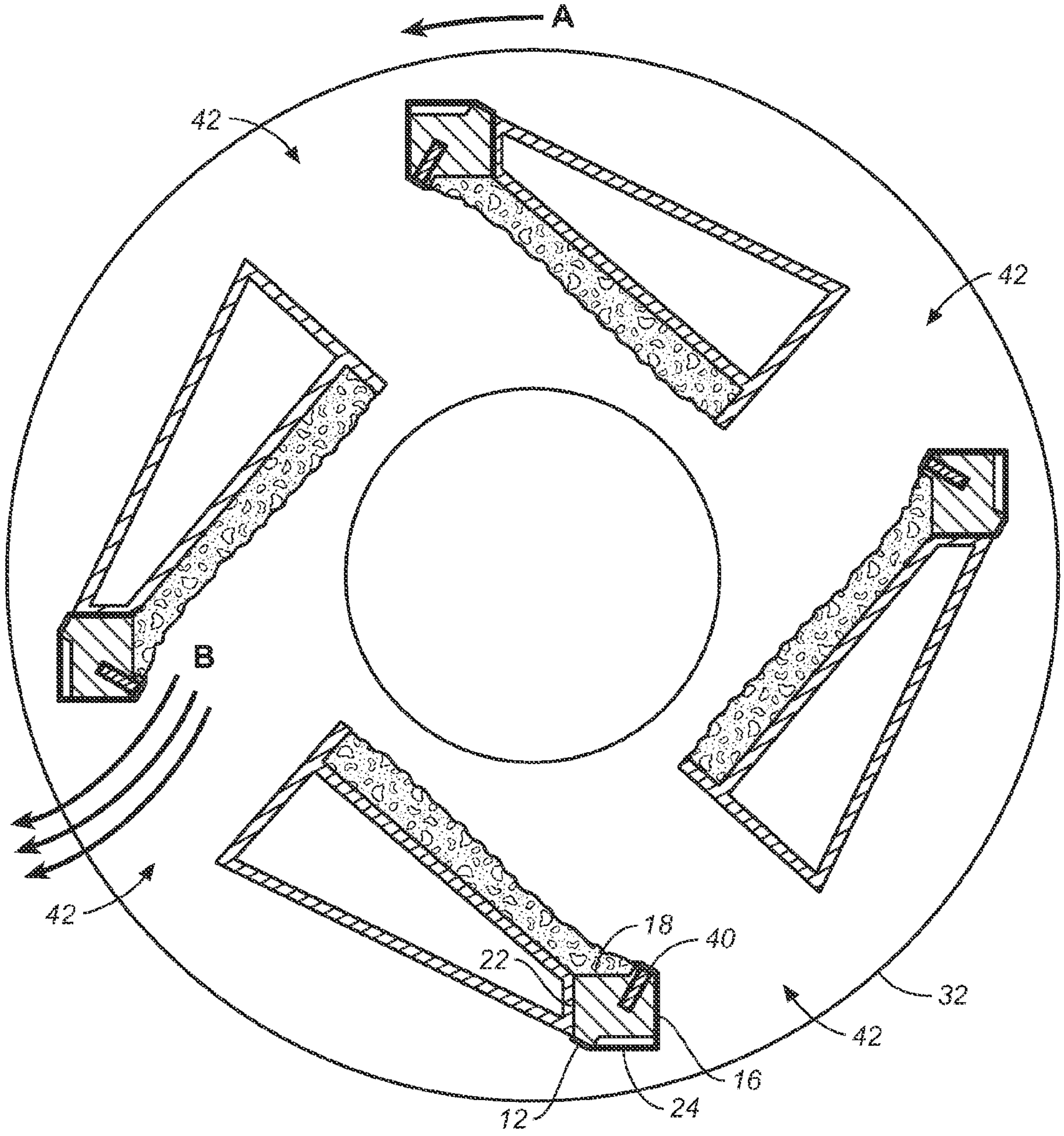
FIG. 1A is a plan view taken along lines 1A-1A of FIG. 1 of the interior of the rotor shown in FIG. 1 depicting a rock bank built up behind each wear tip installed in the rotor.
Figure 2:
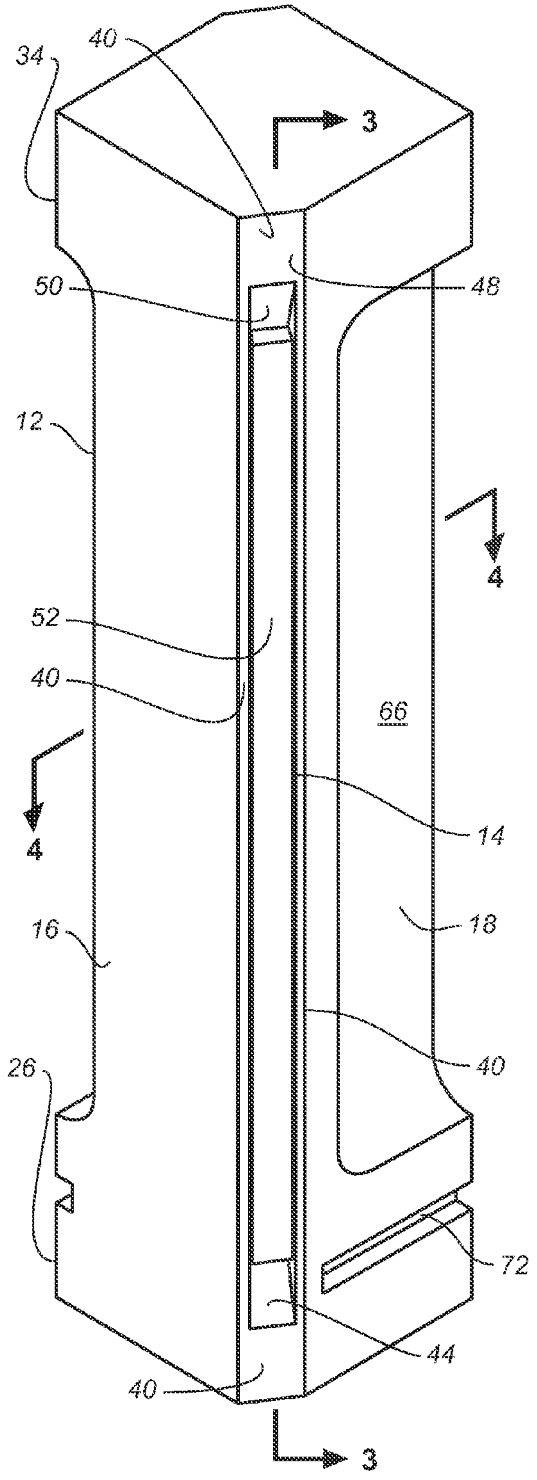
FIG. 2 is a close-up perspective view of the wear tip shown in FIG. 1.
Figure 3:
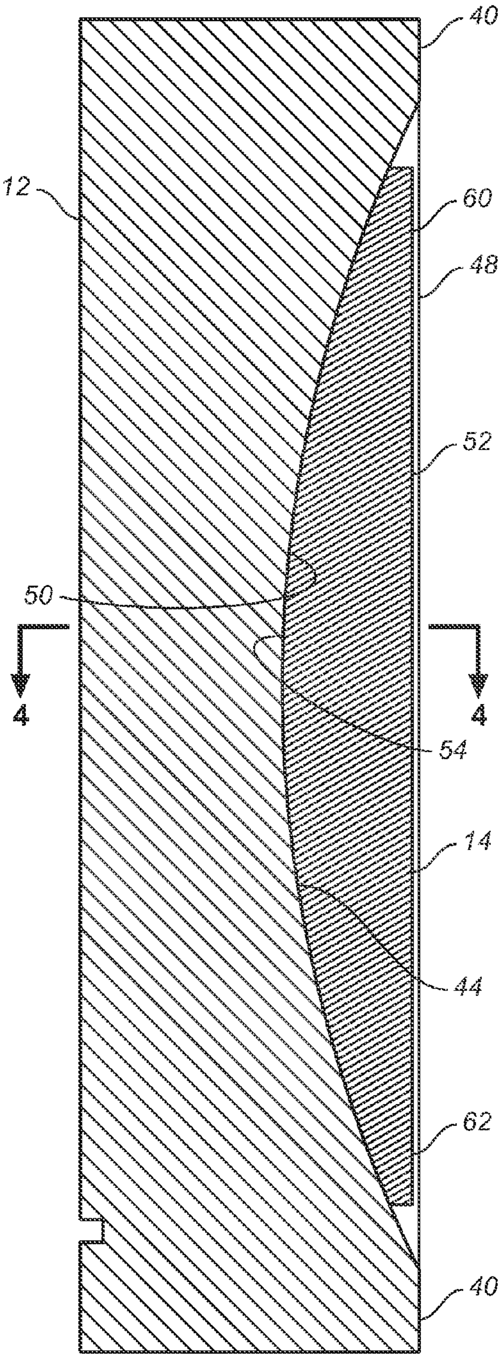
FIG. 3 is a sectional elevation view taken along lines 3-3 of the wear tip shown in FIG. 2.
Figure 4:
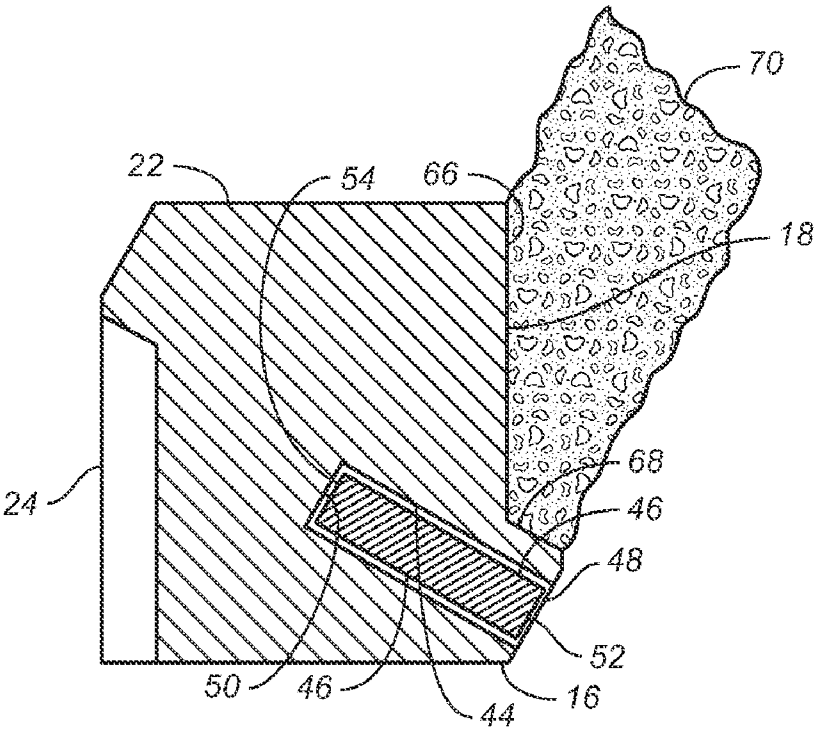
FIG. 4 is a sectional plan view taken along lines 4-4 of the wear tip shown in FIG. 2.
Figure 4A:
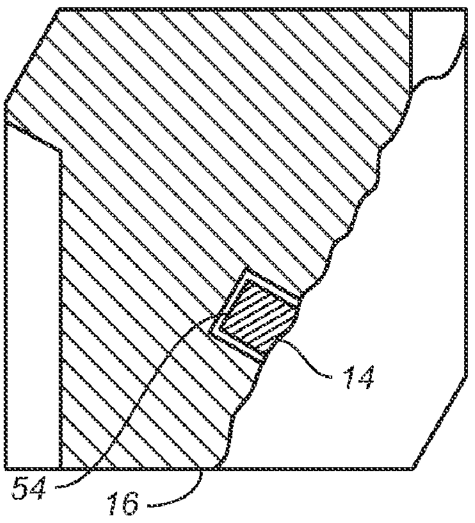
FIG. 4A is a sectional plan view taken along lines 4A-4A of the wear tip shown in FIG. 2A.
Figure 5:
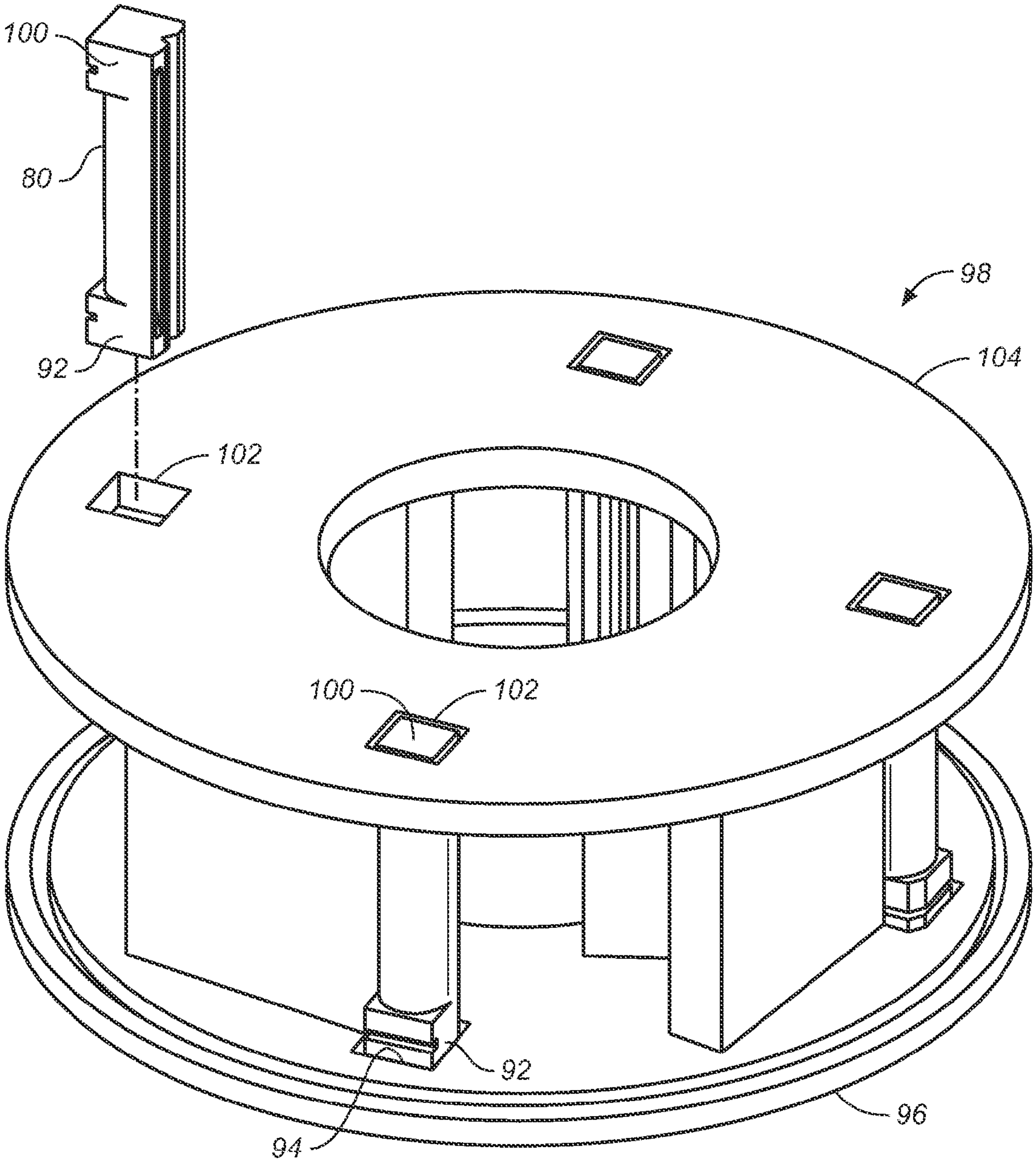
FIG. 5 is a perspective view of another embodiment of a wear tip according to the invention shown in exploded relation to a representative rotor of a rotary mineral breaker.
Figure 6:
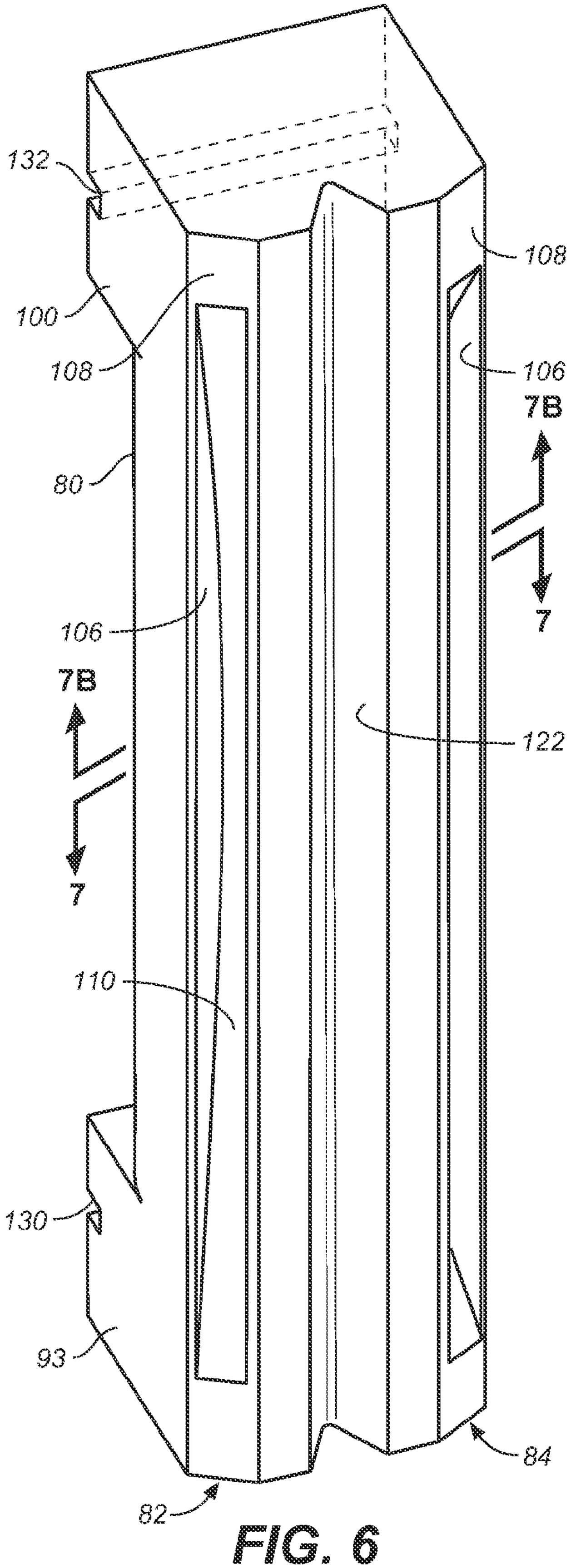
FIG. 6 is a perspective view of the wear tip shown in FIG. 5.

A wear tip for a rotary mineral breaker according to the invention, shown in an exploded position relative to a representative rotor for a mineral breaker, is indicated generally at 10 in FIG. 1. With additional reference to FIGS. 2 and 3, the wear tip 10 comprises a carrier 12 and an insert 14. The carrier 12 has a generally square profile as seen in FIG. 4, and has a forward face 16, an inward face 18, a following face 22, and an outer face 24. As seen in FIG. 1, the bottom 26 of the carrier 12 drops into a socket 28 in the bottom ring 30 of the rotor 32. The top 34 of the carrier 12 is held in place in an aperture 36 in the top ring 38 of the rotor 32. Referring to FIG. 1A, as the rotor 32 spins in the direction indicated by arrow A, the forward face 16 of the carrier 12 is facing generally towards the direction of travel of the rotor 32, the inward face 18 is oriented towards the center of the rotor 32, the following face 22 is facing away from the direction of travel of the rotor 32, and the outer face 24 is oriented away from the center of the rotor 32.

Referring again to FIG. 2, a wear edge 40 is located at the intersection of the forward 16 and inward 18 faces. During operation of the mineral breaker, mineral material is discharged from the spinning rotor 32 along the path indicated by arrows B in FIG. 1A through discharge ports 42. Most of the mineral material passes generally parallel to the wear edge 40 on its discharge path. Even though carriers are typically manufactured of steel or cast iron, it is well known that they will erode rapidly under the severe abrasive forces resulting from the discharging mineral material. Therefore, as shown in FIG. 3, wear edges are provided with an abrasive-resistant insert 14 disposed in a recess 44 in the wear edge 40. The insert 14 is preferably positioned in the recess 44 with its side surfaces 46 at a thirty degree angle to the forward face 16 of the carrier, and hence, at a sixty degree angle to the inward face 18. See FIG. 4. The carriers are positioned in the rotor so that the inserts are nearly perpendicular to the path of the mineral material being ejected from the discharge port thus making the most effective use of the insert material to protect the wear edge 40. Nevertheless it will be understood by those of skill in the art that orientation of the insert may be established at many different angles in the carrier or in the rotor according to the structural characteristics of the breaker and the nature of the mineral material being processed.

Figure 8:
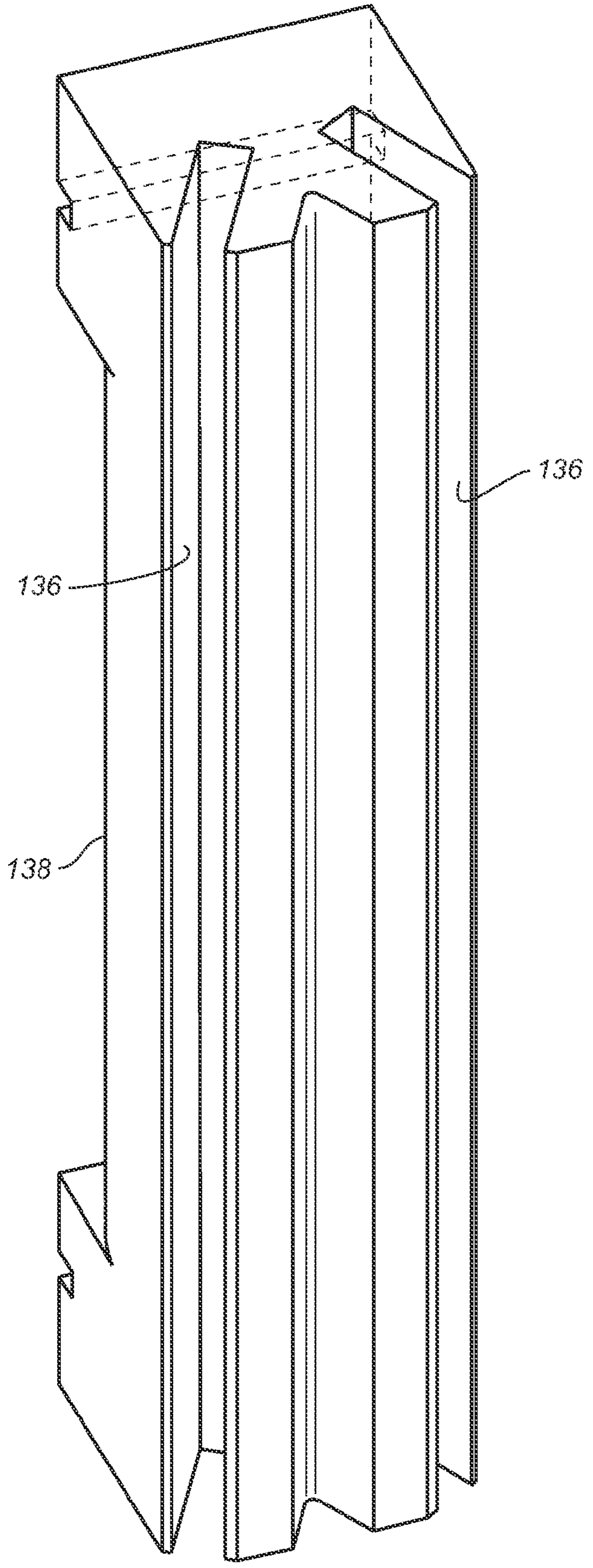
FIG. 8 is a perspective view of a third embodiment of a wear tip according to the invention showing straight-sided recesses for straight-edged inserts extending the full length of the wear tip.

It is known in the art to extend the insert through the entire longitudinal dimension of the carrier, as seen in the embodiment shown in FIG. 8. Inserts have typically been straight-edged with a uniform cross-sectional profile throughout their full length, one commonly used insert having a depth of 0.88 inches and a width of 0.38 inches. As mentioned above, however, the typical wear pattern caused by the abrasive action of the mineral material discharging transversely across the wear edge results in greater wear in the center portion of the insert. As a consequence, when the center of the insert is worn away, even though a substantial amount of the top and bottom portions of the insert remain, the entire insert is usually discarded. It has been determined that a typical wear pattern such as this results in approximately forty to fifty percent of the insert being discarded.

With reference now to FIGS. 1, 1A, 2, 3 and 4, carrier 12 includes a wear edge 40 (see FIG. 2) having a wear face 48 disposed in general planar alignment with the path of the mineral material passing across the wear edge 40. A recess 44 in the wear face 48 has an inner face 50 having a generally concave profile. An insert 14 disposed in the recess 44 has an outer wear surface 52 generally in planar alignment with the wear face 48 of the wear edge 40. An inner surface 54 of the insert 14 has a convex profile conforming to the concave inner face 50 of the recess 44. According to the nature of the minerals being feed into the rotor and the degree of particle size reduction required, rotors are provided in different sizes defined generally by the distance C between the top surface 56 of the top ring 38 and the bottom surface 58 of the bottom ring 30: 9.25", 12.25", and 14.25". Applicants have determined that an 11.81" radius R defining an arcuate profile for the inner surface 54 of the insert 14 yields a center portion-to-top and bottom portions depth ratio in a 12.25" carrier that is consistent with a typical wear pattern on the wear edge 40. See FIG. 1 B. The insert having a 11.81" radiused inner surface 54 preferably has a maximum center depth $D_1$ of 1.25 inches tapering to a relatively shallow depth $D_2$ at the top 60 and bottom 62 ends of the insert. It will be understood by those of skill in the art that the invention is not limited to an insert having a 11.81" radiused inner surface and that a range of convex profiles of the insert's inner surface 54 are intended to fall within the scope of the invention. It should be noted that a small portion of the top and bottom ends 60, 62 of the insert are truncated as a safety measure to eliminate the sharp edges which would otherwise result from intersection of the outer wear surface 52 and inner surface 54.

Figure 1B:
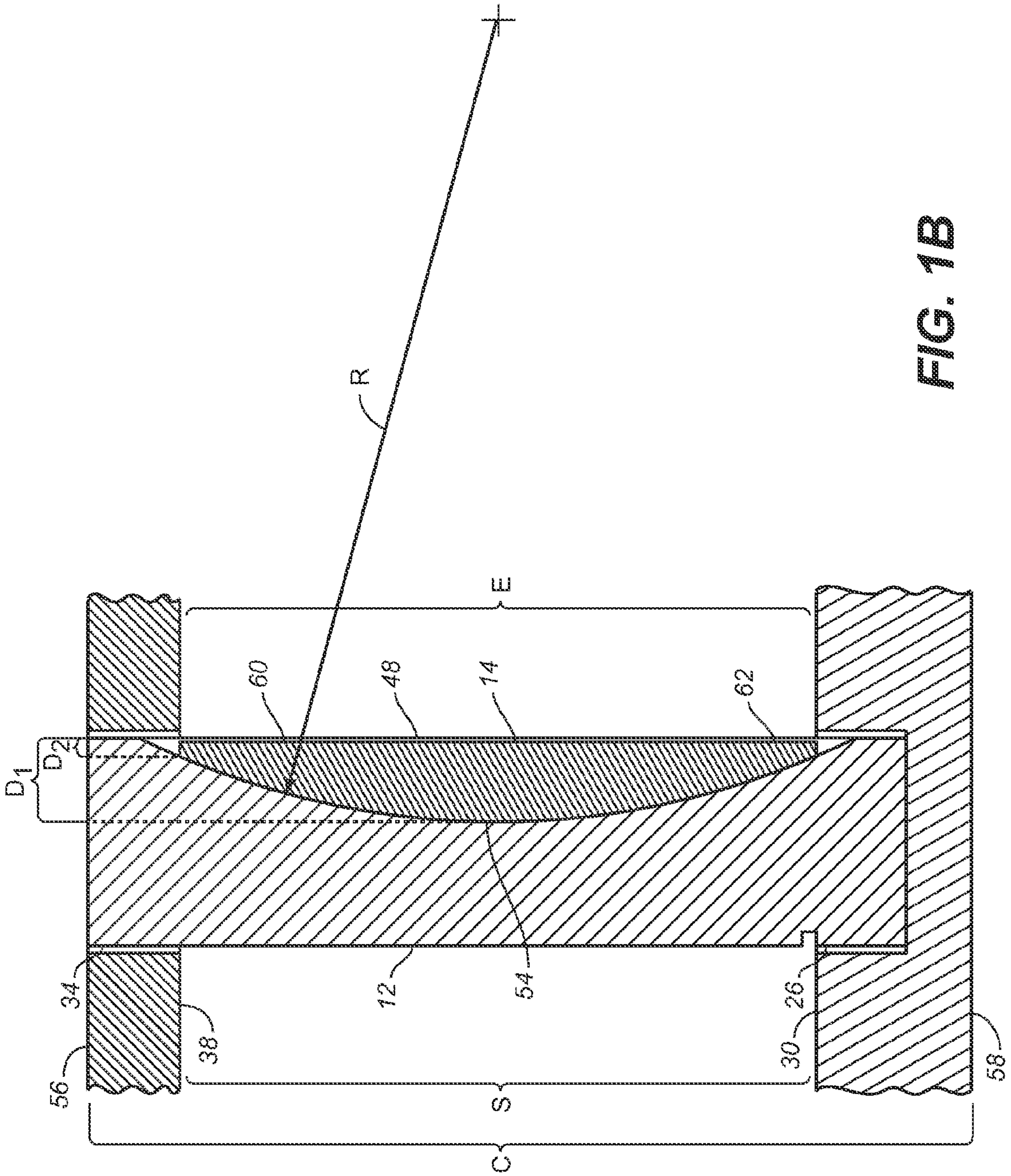
FIG. 1B is a sectional elevation view taken along lines 1B-1B of FIG. 1 of the wear tip and portions of the rotor shown in FIG. 1.
Figure 2A:
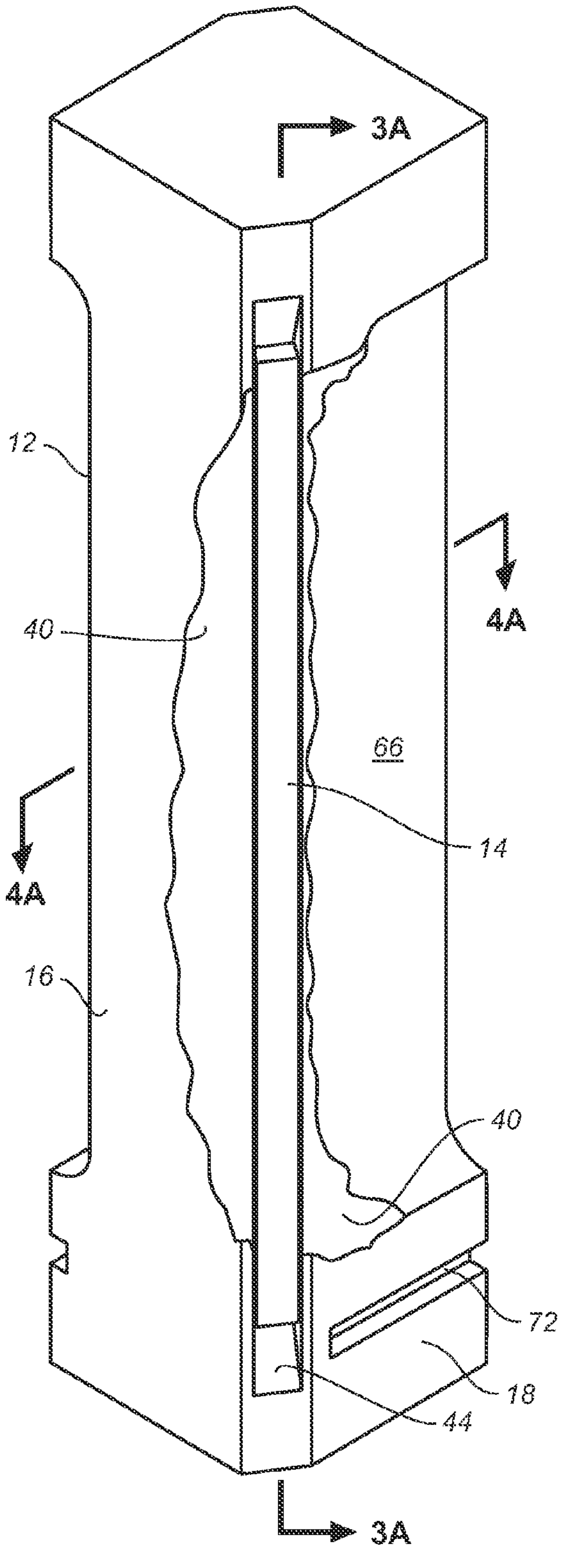
FIG. 2A is a perspective view of a wear tip according to the invention showing a typical wear pattern across the wear edge of the carrier.
Figure 3A:
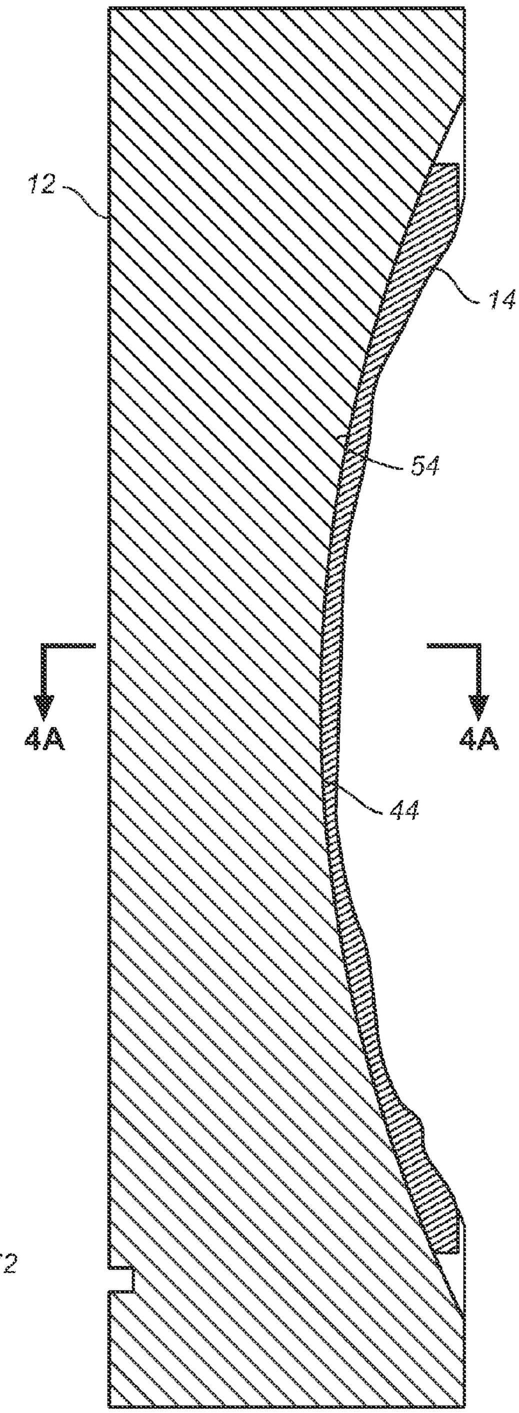
FIG. 3A is a sectional elevation view taken along lines 3A-3A of the wear tip shown in FIG. 2A.

Similarly, since the top 34 and bottom 26 of the carrier 12 are disposed in the top and bottom rings 38, 30 of the rotor 32, protected against wear from discharging mineral matter, it has been found needless to extend the insert into the top 34 and bottom 26 of the carrier 12. Therefore, as shown in FIG. 1B, insert 14 has a longitudinal extent E delimited by the spacing S between the top and bottom rings 38, 30 of the rotor 32. Applicant has determined that an insert having a length of 9.53" and curved inner face 50 with an 11.81" radius R, as discussed above, results in substantially more efficient usage of insert material in a 12.25" carrier. It will be appreciated that the invention is not limited to inserts having a length of 9.53" in a 12.25" carrier and that modifications in the length of the insert are intended to fall within the scope of the invention. Nevertheless, it can be stated generally that an insert has a longitudinal extent E substantially coextensive with the spacing S between the top and bottom rings 38, 30 of the rotor 32 and, hence, the width of the discharging mineral material as it traverses the wear edge 40. In the case of the 12.25" carrier, the typical insert used in the prior art was 12.25" long, 0.88" deep, 0.38" wide, and had a total weight of 1.79 lbs. By reshaping the insert material as described above to be consistent with the wear pattern on the wear edge 40, the same amount of insert material will be more efficiently used, resulting in a longer performing carrier and less waste of the expensive insert material. Approximately 0.79 lbs, or about 45%, of a typical straight-edged insert is discarded when the middle of the insert has been worn nearly through by the usual wear pattern shown in FIGS. 2A and 3A. In comparison, by using a reshaped insert weighing 1.76 lbs, approximately 0.50 lbs, or only about 28%, of the insert will need to be discarded after full utilization of the insert under exposure to the same wear pattern. An insert is typically held in place in the recess with industrial adhesive. Since the insert is of monolithic construction, it has proven to have better adhesion to the carrier 12. In addition, it has been found unnecessary to add beads of weld in the insert at the top and bottom of the insert.

Referring again to FIGS. 1A, 2 and 4, a mineral retaining recession 66 formed in the inward face 18 of the carrier has a forward boundary formed by a mineral retaining surface 68 that is generally in parallel relation with the side surfaces 46 of the insert. In normal operation of the mineral breaker, during which the rotor may spin at up to 3000 rpm, a rock bank 70 builds up behind the mineral retaining surface 68 protecting the carrier 12 and portions of the rotor 32 from the impact of mineral material being flung outward from the center of the rotor 32. The mineral material also fills small gaps between the top 34 of the carrier 12 and the perimeter of the aperture 36 in the top ring 38 of the carrier 12, and between the bottom 26 of the carrier 12 and the walls of the socket 28 in the bottom ring 30 of the carrier 12, helping to anchor the carrier 12 in position in the rotor 32. Removal of the carrier 12 from the rotor 32 involves chipping the rock away from the carrier and inserting a pry bar into pry bar channel 72 to lever the carrier upwards out of the socket 28.

Referring now to FIGS. 5, 6, and 7A-7C, another embodiment of the invention comprises a carrier 80 having two wear edges 82, 84. Similarly to the embodiment discussed above, the carrier 80 has a generally square profile having a forward face 86, an inward face 88, a following face 90, and an outer face 92. A first wear edge 82 is located at the intersection of the forward 86 and inward 88 surfaces of the carrier, and a second wear edge 84 is located at the intersection of the inward 88 and following 90 faces of the carrier 80. The bottom 93 of the carrier 80 drops into a socket 94 in the bottom ring 96 of a rotor 98, and the top 100 of the carrier 80 is held in place by an aperture 102 in the top ring 104 of the rotor 98.

A recess 106 is located in the wear face 108 of each of the wear edges 82, 84 of the carrier 80. In the embodiment shown in FIGS. 6 and 7A-7C, the recess 106 has an inner face 110 having a concave profile and the inserts 112 received in the recesses have an inner surface 114 having a convex profile conforming to the profile of the inner face 110 of the recess 106, as discussed above with respect to the first embodiment shown in FIGS. 1-4A. Each recess 106 is disposed at approximately a sixty degree angle with respect to the inward face 88 of the carrier 80. A middle plane 116 bisects the carrier 80 longitudinally into a forward half 118 including the first wear edge 82 and a following half 120 which includes the second wear edge 84. The forward 118 and following 120 halves of the carrier 80 form mirror images of each other such that the carrier 80 may be flipped over about a horizontal axis to position the following half 120 in place of the forward half 118. This has a significant practical advantage because each carrier 80 having two wear edges 82, 84 effectively takes the place of two carriers having only one wear edge. Moreover, at a point during operation of the breaker when the first wear edge 82 has been worn down such that it has lost its functional value, such as is shown in FIG. 7A, a “replacement” is readily at hand in the second wear edge 84. This has the added advantage that the mineral breaker need not suffer an extended and expensive period of down time while a replacement wear tip is located. Moreover, the second wear edge 84 acts as a de facto safety backup for the first wear edge 82. Due to the extreme environment in which wear tips must function, it is not uncommon for an insert to fall out, break or otherwise fail, leaving the surrounding carrier material exposed to erosion from the mineral material streaming out of the port edge. If there is only wear edge in the carrier, the entire carrier may rapidly fail exposing the rotor and other parts of the breaker to potential damage. However, if a second wear edge is provided, it will essentially “take over” as a second line of defense for the first even if the failure of the first wear edge is not noticed for some time.

A longitudinally extending groove 122 between the first 82 and second 84 wear edges forms a mineral retaining recession for retention of a rock bank 126 during operation of the breaker. The groove 122 has a V-shaped profile, the side walls of which form a first mineral retaining surface 124 adjacent the first wear edge 82 and a second mineral retaining surface 128 adjacent the second wear edge 84. In a first position seen in FIG. 7A in which the first wear edge 82 is in position on the discharge port edge, the first mineral retaining surface 124 acts as the forward boundary for the rock bank. In a second position seen in FIG. 7B in which the carrier 80 has been flipped over to position the second wear edge 84 adjacent the port edge, the second mineral retaining surface 128 takes over the function of being the forward boundary for the rock bank. Whichever wear edge is positioned on the port edge, the other wear edge becomes buried in the rock bank during operation of the breaker such that it is substantially protected from erosion.

When it is necessary to remove the carrier 80 from its seat in the rotor, the rock bank 126 is chipped away from the carrier 80 and a pry bar is fitted into a transversely extending lower pry bar channel 130 in the bottom of the carrier 80 to lever it up. An upper pry bar channel is provided at the top 100 of the carrier 80 for use when the carrier 80 has been flipped over to make use of the second wear edge 84.

Figure 7:
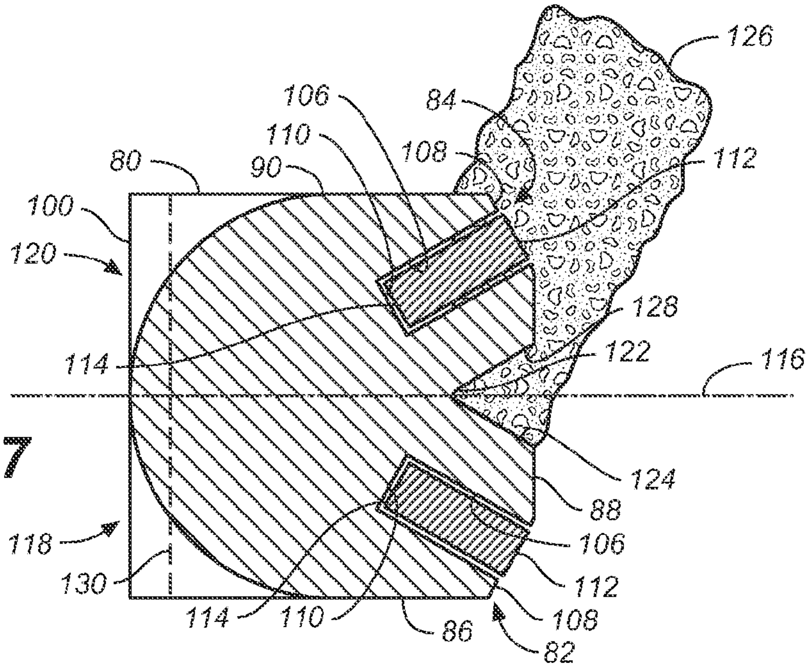
FIG. 7 is a sectional view taken along lines 7-7 of the wear tip shown in FIG. 6, showing a rock bank built up against one wear edge.
Figure 7A:
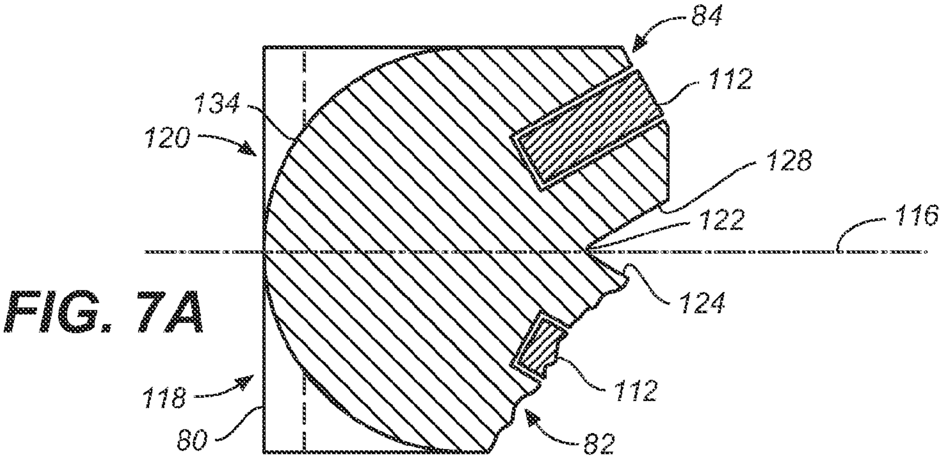
FIG. 7A is a sectional plan view of a wear tip similar to that shown in FIG. 7 depicting a typical wear pattern on one of the wear edges.
Figure 7B:
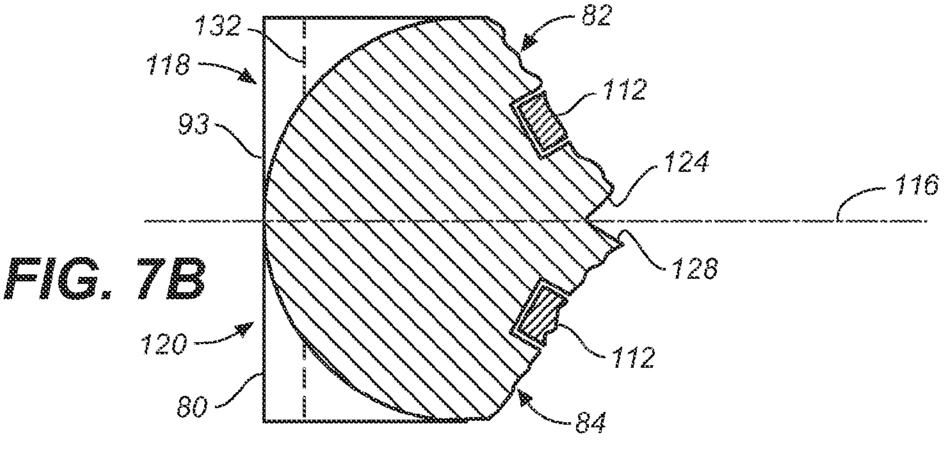
FIG. 7B is a sectional plan view taken along line 7B-7B of the wear tip shown in FIG. 6 depicting the second wear edge in worn condition.

The outer face 134 of the carrier 80 has a semi-circular profile as seen in FIGS. 7A-7C, which makes the carrier 80 easier to handle, reduces the amount of raw material needed for manufacturing each unit, and presents an aesthetically pleasing appearance even after heavy use of the part.

A third embodiment of the invention is shown in FIG. 8, which is similar to the second embodiment described above, except that each recess 136 extends through the full length of the carrier 138 and has a uniform rectangular profile to accommodate a standard straight-edged insert.

The invention has the distinct advantage that the shape of the insert material is consistent with the wear pattern on the insert caused by the streaming mineral material, resulting in substantially improved consumption of the tungsten carbide insert material. The second embodiment of the invention combines that advantage with the ability to invert the carrier in which one insert has been used to quickly replace it with the unused insert. Thus, a single wear tip may be used twice rather than replacing it with an entirely new wear tip when the insert has lost its usefulness. The cost of the insert material in the arcuate shape is approximately the same as conventional inserts, yet provides the potential for nearly double the wear.

There have thus been described certain preferred embodiments of a wear tip for a rotary mineral breaker. While preferred embodiments have been described and disclosed, it will be recognized by those with skill in the art that modifications are within the true spirit and scope of the invention. The appended claims are intended to cover all such modifications.

I claim:

1. A wear tip for use in the rotor of a centrifugal mineral breaker, the rotor having discharge ports through each of which mineral material is ejected forming a discharge path, the wear tip comprising:

a carrier having a forward face, a following face generally parallel to said forward face, an inward face generally perpendicular to said forward and following faces, and at least two wear edges each for disposition transversely to the discharge path of the mineral material being ejected out of the rotor, said at least two wear edges including a first wear edge disposed at the intersection of said forward face and said inward face, and a second wear edge disposed at the intersection of said following face and said inward face, said wear edges each having a wear face and a recess in said wear face, and an insert of abrasion resistant material disposed in each said recess, said insert having an outer wear surface and an arcuate inner surface, said outer wear surface of each said insert generally in planar alignment with said wear face.

2. The wear tip of claim 1 further comprising:

said carrier having a longitudinal dimension, and said inward face having a longitudinally extending groove between said first and second wear edges.

3. The wear tip of claim 2 wherein:

said groove has a V-shaped cross-section.

4. The wear tip of claim 3 wherein:

said V-shaped groove having first and second side walls, said first side wall forming a first mineral retaining surface adjacent said first wear edge, and said second side wall forming a second mineral retaining surface adjacent said second wear edge.

5. The wear tip of claim 1 further comprising:

said carrier having a longitudinal dimension, said insert having a cross-sectional profile in a plane generally in parallel alignment with said longitudinal dimension, said cross-sectional profile having an arcuate inner edge defined by said arcuate inner surface.

6. The wear tip of claim 1 further comprising:

a middle plane disposed in generally parallel relation to said forward and following faces, said middle plane bisecting said carrier into a forward half and a following half, said forward and following halves forming mirroring symmetrical halves of said carrier about said middle plane.

7. The wear tip of claim 1 wherein:

said recess in said wear face of each of said wear edges has an inner face having a generally concave profile conforming to said arcuate inner surface of said insert.

8. The wear tip of claim 1 wherein:

said carrier has a generally square cross-sectional profile.

9. The wear tip of claim 1 further comprising:

said insert having two generally parallel side surfaces, and said side surfaces are disposed at approximately a sixty degree angle relative to said inward face of said carrier.

10. The wear tip of claim 1, the rotor having a center, the wear tip further comprising:

said carrier having an outer face for disposition facing generally away from the center of the rotor, said outer face of said carrier having an upper portion and a lower portion, and said upper and lower portions each having a pry bar channel for use prying said carrier out of the rotor, said pry bar channel extending transversely to the longitudinal dimension of said carrier.

11. The wear tip of claim 10 wherein:

said outward face has a generally semi-circular profile intermediate said upper and lower portions.

12. A wear tip for use in the rotor of a centrifugal mineral breaker, the rotor having discharge ports through each of which mineral material is ejected forming a discharge path, the wear tip comprising:

a carrier having a longitudinal dimension, a forward face, a following face generally parallel to said forward face, an inward face generally perpendicular to said forward and following faces, and at least two wear edges each for disposition transversely to the discharge path of the mineral material being ejected out of the rotor, said inward face having a longitudinally extending groove between said first and second wear edges, said at least two wear edges including a first wear edge disposed at the intersection of said forward face and said inward face, and a second wear edge disposed at the intersection of said following face and said inward face, said wear edges each having a wear face and a recess in said wear face, and an insert of abrasion resistant material disposed in each said recess, said insert having an outer wear surface and an arcuate inner surface, said outer wear surface of each said insert generally in planar alignment with said wear face.

13. A wear tip for use in the rotor of a centrifugal mineral breaker, the rotor having discharge ports through each of which mineral material is ejected forming a discharge path, the wear tip comprising:

a carrier having a longitudinal dimension, a forward face, a following face generally parallel to said forward face, an inward face generally perpendicular to said forward and following faces, a middle plane disposed in generally parallel relation to said forward and following faces, and at least two wear edges each for disposition transversely to the discharge path of the mineral material being ejected out of the rotor, said inward face having a longitudinally extending groove between said first and second wear edges, said at least two wear edges including a first wear edge disposed at the intersection of said forward face and said inward face, and a second wear edge disposed at the intersection of said following face and said inward face, said wear edges each having a wear face and a recess in said wear face, and said middle plane bisecting said carrier into a forward half and a following half, said forward and following halves forming mirroring symmetrical halves of said carrier about said middle plane, and an insert of abrasion resistant material disposed in each said recess, said insert having an outer wear surface, an arcuate inner surface, and a cross-sectional profile in a plane generally in parallel alignment with said longitudinal dimension, said outer wear surface generally in planar alignment with said wear face, and said cross-sectional profile having an arcuate inner edge defined by said arcuate inner surface.

14. The wear tip of claim 13 further comprising:

said groove having first and second side walls, said first and second side walls intersecting longitudinally to form a V-shaped cross-section, said first side wall forming a first mineral retaining surface adjacent said first wear edge, and said second side wall forming a second mineral retaining surface adjacent said second wear edge.

* * * * *

UNITED STATES PATENT AND TRADEMARK OFFICE

CERTIFICATE OF CORRECTION

PATENT NO. : 7,607,601 B2
APPLICATION NO. : 12/235844
DATED : October 27, 2009
INVENTOR(S) : Damian Rodriguez It is certified that error appears in the above-identified patent and that said Letters Patent is hereby corrected as shown below:

In column 1, line 53, “insert” should read --recess--.
In column 3, line 60, “feed” should read --fed--.
In column 5, line 47, --one-- should be inserted between “only” and “wear.”
In column 6, line 32, --it-- should be inserted between “yet” and “provides.”

Signed and Sealed this

Thirtieth Day of March, 2010

David J. Kappos
*Director of the United States Patent and Trademark Office*